United States Patent [19]

Ranalletta

[11] Patent Number: 4,890,729
[45] Date of Patent: Jan. 2, 1990

[54] LENS RETAINING APPARATUS

[75] Inventor: Joseph V. Ranalletta, Guntersville, Ala.

[73] Assignee: Ryder International Corporation, Arab, Ala.

[21] Appl. No.: 342,979

[22] Filed: Apr. 25, 1989

[51] Int. Cl.$^4$ ............................................. B65D 85/38
[52] U.S. Cl. ..................................................... 206/5.1
[58] Field of Search ........................................ 206/5.1

[56] References Cited

U.S. PATENT DOCUMENTS

| 3,770,113 | 11/1973 | Thomas | 206/5.1 X |
| 3,997,049 | 12/1976 | Sherman | 206/5.1 |
| 4,200,187 | 4/1980 | Thomas | 206/5.1 |
| 4,750,610 | 6/1988 | Ryder | 206/5.1 |
| 4,807,750 | 2/1989 | Ryder et al. | 206/5.1 |
| 4,826,001 | 5/1989 | Castillo | 206/5.1 |

Primary Examiner—William Price
Attorney, Agent, or Firm—R. A. Giangiorgi

[57] ABSTRACT

A contact lens cleaning appliance which permits convenient removal of contact lenses disposed within the appliance by mounting the lens supporting surfaces on a hingedly attached lens retaining cover mounted to the appliance base. Mounting the lens supporting surfaces on the lens retaining covers provides the maximum clearance for accessing contact lenses when removing them from the lens cleaning appliance. The hinge arrangement includes an over-center hinge which retains the covers in an open position without assistance and retains the covers in a closed position without a latching device.

21 Claims, 2 Drawing Sheets

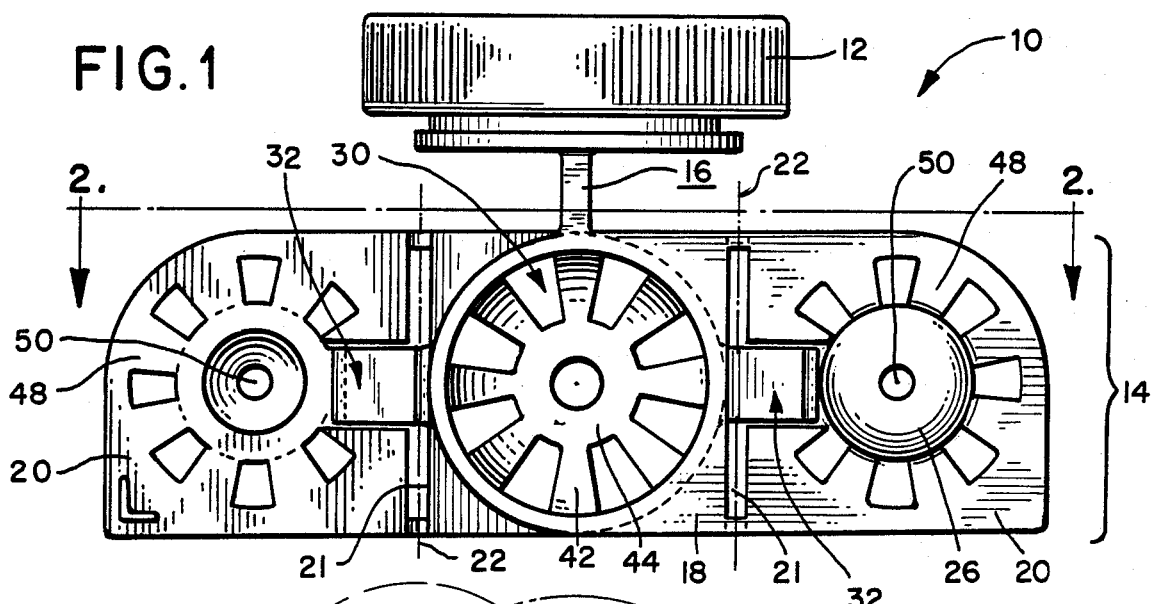
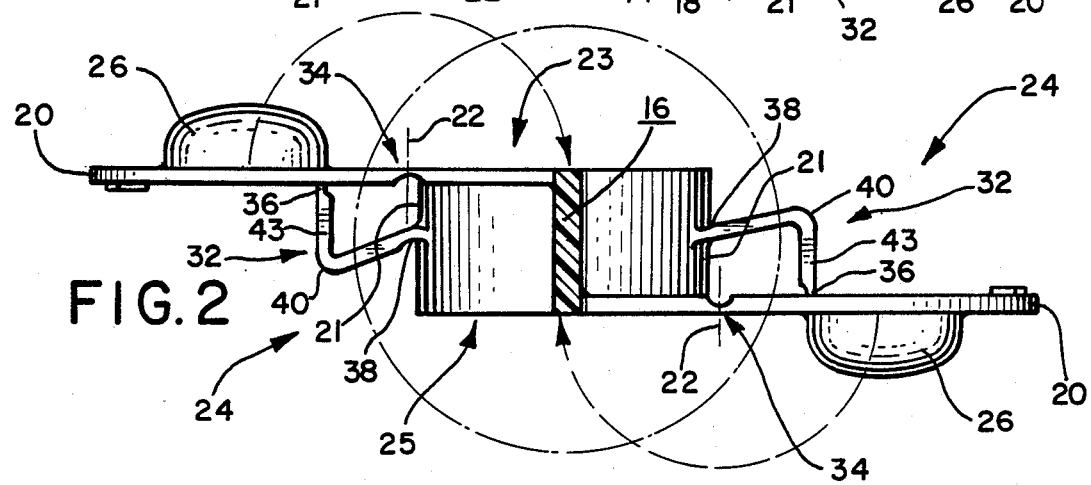
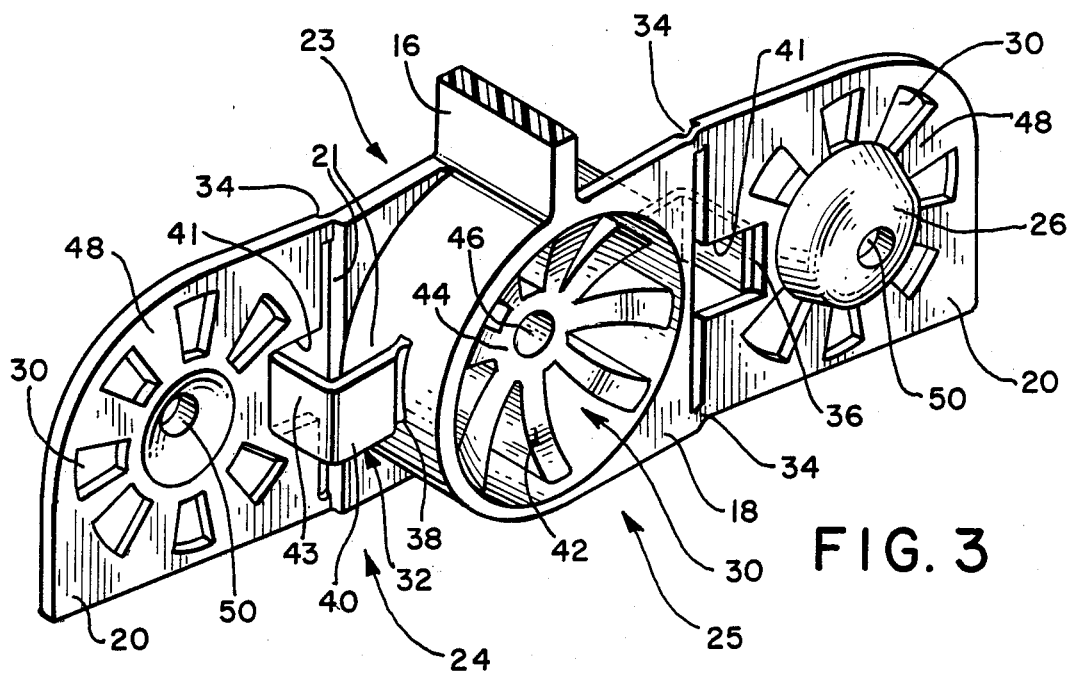

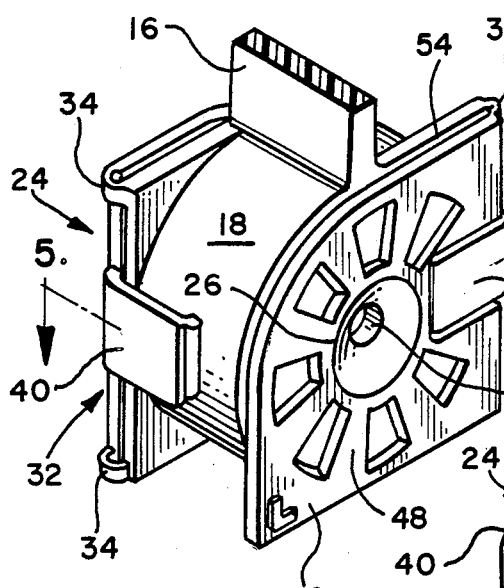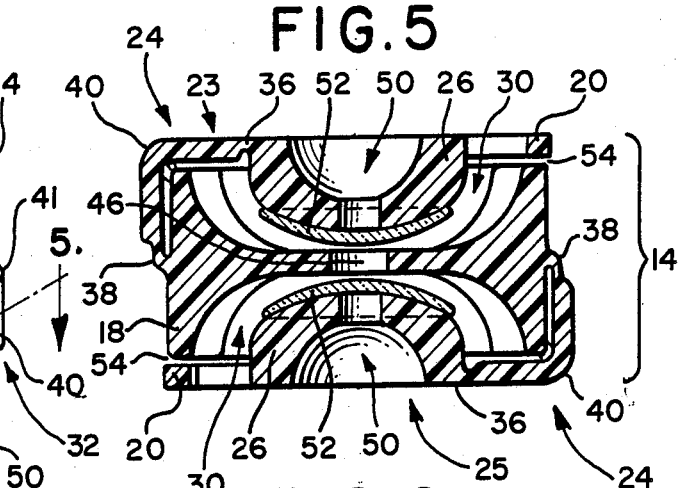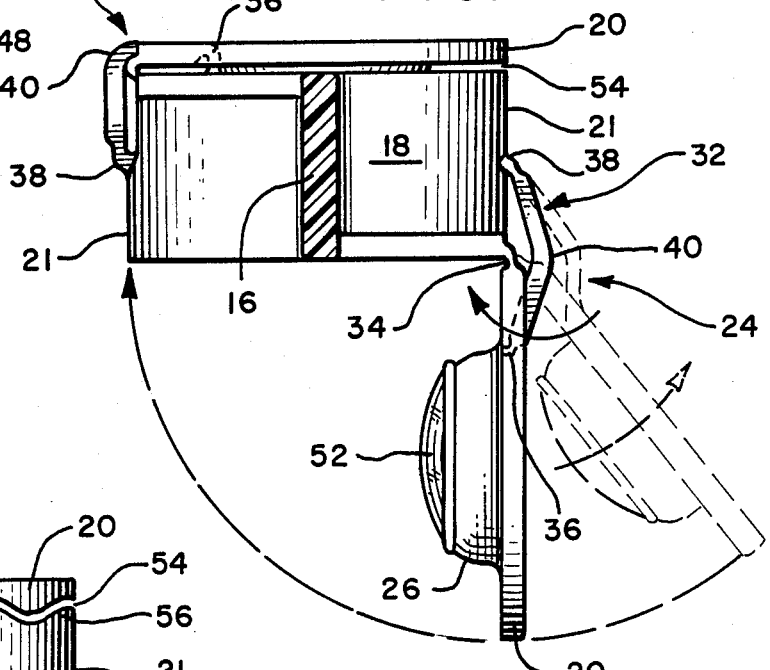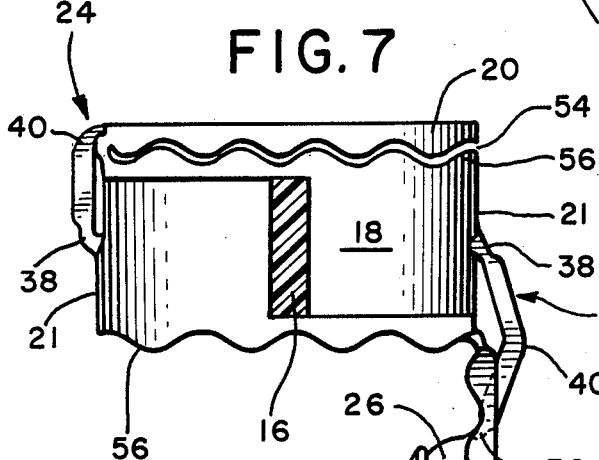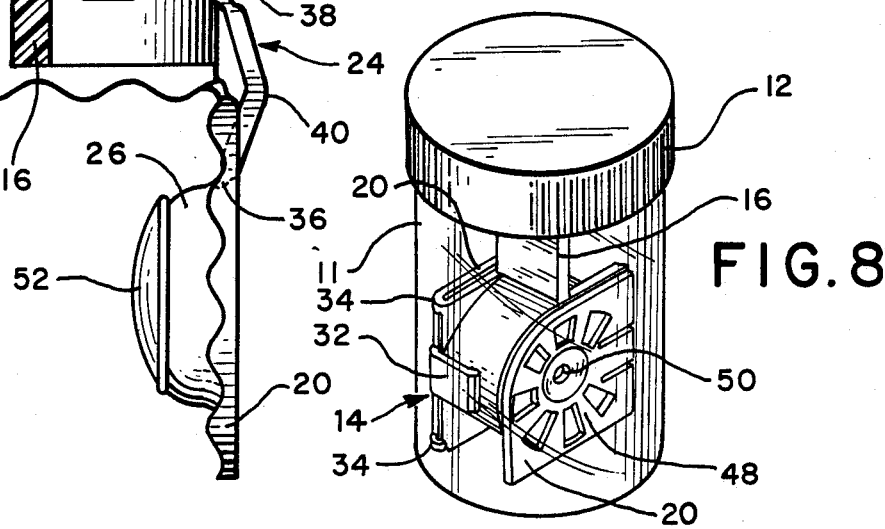

LENS RETAINING APPARATUS

BACKGROUND OF THE INVENTION

This invention relates generally to a lens retaining appliance and more particularly to a lens retaining appliance for use in a device for the cleaning, storage or disinfecting of contact lenses, or the like. The appliance of the invention allows for more convenient access to the contact lenses retained therein and hingedly opens and closes using integrally formed over-center hinges and stabilizing hinges, and can be economically fabricated by conventional molding techniques.

A variety of contact lens storage/cleaning devices are available which are capable of retaining a pair of contact lenses in a lens retaining structure to thereby captively immerse the lenses in a contact lens storage/cleaning solution disposed within a container. Many of these contact lens cleaning cases provide a basket-like structure to retain the contact lenses yet allow cleaning solution to come into contact with the lenses by passing through openings between basket-like webs or spokes. These basket structures are hingedly attached to a base or body structure which is associated with a cap for closing an open end of a container which holds the contact lens storage/cleaning solution.

Typically, the basket-like structures are hingedly attached by a freely moving hinge consisting of hinge knuckle members which mount over hinge pins. Use of this type of freely moving hinge for a contact lens retaining basket structure is shown in U.S. Pat. No. 4,750,610 to Ryder, U.S. Pat. No. 4,637,919 to Ryder et al., and U.S. Pat. No. 3,770,113 to Thomas. While in all of the above applications the freely moving hinge structure achieves its intended purpose, the basket-like structure must be held well away from the base or body structure in order to remove the contact lens.

Moreover, in prior art contact lens cases, the lens supporting surfaces are usually positioned on opposing sides of a lens supporting frame portion. Commonly this lens supporting frame is attached to a cap which is used to seal the open end of the container while the contact lenses are immersed in the solution disposed within the container. The baskets generally open upwardly away from the base towards the attached cap. Hence, the basket-like structure must be held out of the way and, because the lenses are retained on lens supporting surfaces relatively closely proximate the cap, removal of the lenses is difficult in the limited space provided under the upwardly hinged basket.

The problem of removing contact lenses from the lens supporting surfaces which are commonly convex partially hemispherical structures is compounded by the fact that the lenses tend suctionally to adhere to the lens supporting surface upon removal of the lens retaining structure from the contact lens cleaning solution. Therefore, in the prior art contact lens cases, with the lens supporting surfaces oppositely attached to a central supporting frame, it is necessary to reach into a relatively limited space to remove the contact lenses and peel the lenses away from the lens supporting surfaces.

Due to the foregoing difficulty, users of this type of contact lens case often invert the lens retaining structure to reach the suctionally adhered lenses more directly to eliminate the need to hold the baskets out of the way. While this provides a partial solution to the problems as noted above, it creates another problem in that the covers often interfere with the removal of a contact lens adhering to the lens retaining structure as the lens retaining structure is maneuvered in one hand in order to grip the contact lens with the other hand. The best solution would be to provide a cover which is retained in an open position and not freely hinged. Also, any fluid left on the lens retaining structure after removal from the lens cleaning solution tends to drip off of the structure as it is manipulated to get at the contact lens or accumulates in the cap and overflows the cap edge.

The present invention, as will be detailed more fully hereinafter, overcomes the above-described problems. More specifically, the present invention provides a contact lens case which permits convenient removal of contact lenses disposed therein and provides hingedly attached lens retaining structure covers which remain open without assistance, and lens supporting surfaces which are positioned so as to provide maximum clearance for reaching in to remove contact lenses therefrom.

OBJECTS AND SUMMARY OF THE INVENTION

It is an object of the present invention to provide an improved lens retaining appliance which allows for more convenient access to contact lenses retained therein by providing lens supporting surfaces on the cover portion of the lens retaining structure such that contact lenses supported thereagainst are easily removed from the lens retaining structure.

Another object of this invention is to provide a lens retaining appliance with a cover portion which is hingedly attached to the lens supporting base by an over-center hinge and retains the cover in a closed position while retaining contact lenses in the lens retaining structure and retains the cover in an open position when removing or inserting contact lenses.

It is a more specific object of this invention to provide a lens retaining appliance which is completely integrally formed such that the cap, stem, lens supporting base, covers and hinges are all integrally formed as a single molded component.

In accordance with the foregoing, the present invention comprises an improved lens retaining appliance for cleaning contact lenses which allows for more convenient access to contact lenses retained therein and which hingedly opens and closes using integrally formed over-center hinges.

BRIEF DESCRIPTION OF THE DRAWINGS

The features of the present invention which are believed to be novel are set forth with particularity in the appended claims. The organization and manner of the operation of the invention, together with the further objects and advantages thereof may best be understood by reference to the following description, taken in connection with the accompanying drawings in which like reference numerals identify like elements, and in which:

FIG. 1 is a front elevational view of a lens retaining structure of the present invention with the cover means opened away from the lens supporting base;

FIG. 2 is a partial plan view of the structure shown in FIG. 1, taken along the line 2—2 of FIG. 1, and provides a detailed illustration of the over-center hinge and stabilizing hinge of each lens retaining cover;

FIG. 3 is a partial perspective view of the structure shown in FIGS. 1 and 2;

FIG. 4 is a partial perspective view similar to FIG. 3, with the lens retaining covers closed over the lens supporting base for retaining contact lenses therebetween;

FIG. 5 is a cross-sectional view of the lens retaining structure shown in FIG. 4, taken along the line 5—5 of FIG. 4, and illustrating the fashion in which contact lenses are retained between the convex, partially hemispherical lens supporting surfaces, and the concave receiving portions;

FIG. 6 is a plan view similar to FIG. 2 showing the cooperative articulation of the over-center hinge and the stabilizing hinge;

FIG. 7 is a view similar to FIG. 6 and illustrates the further provision of a mating scalloped surfaces formed along the abutting surfaces of the lens retaining cover and the lens supporting base to prevent contact lenses from passing between a gap formed therebetween; and FIG. 8 is a perspective view of the lens retaining appliance of the present invention disposed in a container for a lens storage/cleaning solution which is sealed on its open end by the cap attached to the lens retaining appliance.

It should be noted that dimensional relationships between members of the illustrated embodiment may vary in practice or may have been varied in the illustrations to emphasize certain features of the invention.

DETAILED DESCRIPTION OF THE ILLUSTRATED EMBODIMENT

While this invention is susceptible to embodiment in many different forms, there is shown in the drawings and will be herein described in detail one specific embodiment with the understanding that the present disclosure is to be considered an exemplification of the principals of the invention, and is not intended to limit the invention to the embodiment illustrated.

FIG. 1 provides a front elevational view of the lens retaining appliance 10 removed from the lens solution container 11 (shown in FIG. 8). The lens retaining appliance 10 is comprised of cap 12, a lens retaining means 14 and a stem portion 16. The cap means 12 is connected to the lens retaining means 14 by the stem portion 16. In the illustrated embodiment, the lens retaining means 14 and stem 16 are integrally formed of plastic. The retaining means 14 and stem 16 are then affixed to the previously formed cap 12 by sonic welding or with an appropriate adhesive. Typically, the lens retaining means 14 attached to the stem portion 16 is disposed within a contact lens storage/cleaning solution which is housed in the lens cleaning container 11 (shown in FIG. 8), with the cap means 12 sealing the open end of the container 11.

The lens retaining means 14 is comprised of a base portion 18 and a pair of cover means 20 which are integrally hingedly attached along a hinge axis 22 by hinge means 24. When the covers 20 are closed against the base portion 18, two sections, a first section 23 and a second section 25, are formed therebetween wherein contact lenses are retained. Each cover means or cover 20 is formed with a convex lens supporting surface 26 which is formed to provide a cooperative supporting or retaining surface for retaining or receiving the concave surface of a contact lens disposed thereagainst. Additionally, at least one cover 20 is integrally formed with lens indicia 21 for identifying which lens of a pair of lenses is retained within each section 23, 25 of said lens retaining means 14. Formed in the base portion 18 is a concave lens supporting surface or lens receiving portion 30 which operatively cooperates with the lens supporting surface 26 of the cover 20 to retain a contact lens positioned therebetween. This arrangement is preferred, but may be reversed if desired without departing from the invention.

As better shown in the plan view of FIG. 2, the covers 20 are integrally hingedly attached to the side surfaces 21 of the base portion 18 by the hinge means 24. Each of the hinge means 24 are comprised of an over-center hinge 32 and a pair of stabilizing hinges 34, formed above and below the over-center hinge 32, which cooperatively operate about the hinge axis 22 when the cover 20 is urged into abutting engagement with the base portion 18. The stabilizing hinges 34 prevent the covers 20 from twisting about the over center hinge 32 when the covers 20 are opened or closed. Both the over-center hinge 32 and the stabilizing hinges 34 are integrally formed in the lens retaining appliance 10 of a material which provides the necessary degree of flexibility to retain structural integrity after repeated flexing and stretching of the hinge means 24 when the covers 20 are opened and closed.

The over-center hinge 32 is formed of an integral strip of material with one end attached to the cover 20 by a cover hinge portion 36 and with the other end attached to the base portion 18 by a base hinge portion 38. Along the over-center hinge 32, positioned between the cover hinge portion 36 and the base hinge portion 38, a hinge elbow portion 40 is formed to permit flexion of the over-center hinge 32 when the cover 20 is moved towards or away from the base portion 18. As best shown in FIGS. 3 and 4, when the over center hinge 32 is closed against the base portion 18, one part 43 of the hinge elbow portion 40 is received by a corresponding hinge articulation cut-out 41 from which it was struck out during initial formation. This prevents any part of the hinge 32 from protruding from the lens retaining means 14. The cut out 41 also permits a more secure retention of the cover 20 in the closed position by reducing the angle of the hinge elbow portion 40 thereby allowing the over center hinge 32 to more completely recover its as-formed shape.

FIG. 3 is a partial perspective view of the lens retaining appliance 10, with the cap means 12 removed for clarity, which provides a better view of the action of the hinge means 24 illustrated in FIGS. 1 and 2. As shown, the covers 20 are in the open position to allow access to the lens supporting surfaces 26 thereof. In this position, the base hinge portion 38, hinge elbow portion 40, cover hinge portion 36 and the stabilizing hinges 34 are all flexed into a position which retains the cover means 20 in an open position.

When the covers 20 are in the open position, the complementarily shaped curved portions of the lens supporting surface 26 and the concave lens receiving portion 30 are displayed. The concave lens receiving portion 30 has been formed in the base portion 18 with a plurality of base spokes 42 radiating outwardly from a hub structure 44 through which a base aperture 46 is formed. Similarly, the lens supporting surface 26 is supported generally in the center of the cover 20 by a plurality of cover spokes 48 radiating outwardly from the lens supporting surface 26. Also, the lens supporting surface 26 has a cover aperture 50 formed therethrough. The areas between the base spokes 42 and the cover spokes 48 and the base aperture 46 and cover aperture 50 permit lens cleaning solution to flow through the lens retaining means 14 thus permitting more thorough bathing of the contact lenses held therein.

FIG. 4 shows a perspective view similar to FIG. 3 in which the covers 20 are closed in abutting engagement against the base portion 18. In this position, the hinge means 24 retains the covers 20 in abutting engagement with the base portion 18. The over-center hinge 32 of the hinge means 24 is dimensioned and formed to flex at the hinge elbow portion 40 to approximately a right angle when in either of the open or closed cover 20 position The angle of the hinge elbow portion 40 flexes between a right angle and an obtuse angle while the cover is being opened or closed. When the covers 20 are either fully opened or fully closed, the material of the over-center hinge 32 is in a relaxed or "as-formed" state whereby the material in the cover hinge portion 36, base hinge portion 38 and the hinge elbow portion 40 are in unstressed positions. In intermediate portions, the hinge 32 is stressed and biased toward one of the fully open or fully closed conditions. The direction of this biasing force changes as the hinge moves past its center point or "over center" during movement in either direction.

FIG. 6 further shows the cooperative articulation of the over-center hinge 32 and the stabilizing hinge 34. As the cover 20 is closed towards the base portion 18, the over-center hinge 32 is tensionally stressed between the cover hinge portion 36 and the base hinge portion 38. Tension is developed in the material of the over-center hinge 32 due to flexing the generally right angled hinge elbow portion 40 to an obtuse angular position. Since the over-center hinge 32 is formed with the hinge elbow portion at a right angle, obtusely flexing the right angle portion of the over-center hinge 32 puts stress on the over-center hinge 32 material with the material memory urging it back to its original "as-formed" right angle shape. These stresses are alleviated in both the fully open and the fully closed position since in these positions, the hinge elbow portion 40 is generally at a right angle. At any position between either completely open or completely closed the cover 20 will be urged by the over-center hinge 32 into the position which does not require further application of external force to attain.

As shown in FIG. 5, when the cover 20 is in the closed position, a contact lens 52 may be captively retained between the lens supporting surface 26 and the concave lens receiving portion 30. The openings in the cover aperture 50 and the base aperture 46 permit fluid to pass between the two lens retaining sections of the lens retaining means 14. The cover aperture 50 allows lens cleaning solution to bathe the concave portion of the contact lens retained therein while the base spokes 42, cover spokes 48 and base aperture 46 generally allow solution to bathe the convex surface of the contact lens 52 retained therein.

As is additionally shown in FIG. 5, the convex lens supporting surface 26 generally more accurately matches the concave surface of a contact lens than the concave lens receiving portion 30. The shape of the lens supporting surface 26 has been formed to enhance the tendency for the contact lens 52 to suctionally adhere to the convex lens supporting surface 26. As shown in FIG. 6, by retaining the contact lens on the lens supporting surface 26 the contact lenses 52 are more conveniently accessible to the user when the cover 20 is urged away from the base portion 18 (i.e., opened). Moreover, with the contact lenses 52 retained in this position, the user removes the contact lenses 52 from the lens supporting surface 26 by grasping the convex surface of the contact lens and not the concave, eye contacting, surface of the contact lens 52. Because the contact lens is handled on the surface which does not directly contact the eye, the possibility of smudging of just-cleaned lens is reduced.

FIG. 7 illustrates an alternate embodiment of the lens cleaning appliance 10 as shown in the FIGS. 1 through 6 above. As shown in FIG. 6, a small space or gap 54 may remain between the abutting surfaces of the cover 20 and the base portion 18 when the cover is closed. The gap 54 is may be formed due to the "memory" resiliency or flexibility of the material used in forming the appliance 10 such that when the cover 20 is opened the material acquires a temporary shape or set and when the cover 20 is closed a short period of time is required for the temporary shape memory to dissipate as the material expands or contracts whereby the "as-formed" shape is "remembered". Therefore, in order to overcome the problems of the gap 54 which may be formed between the abutting surfaces in this type of design, a cooperatively mating scalloped surface 56 is formed on the abutting surfaces of the cover 20 and the base portion 18. The scalloped shaped surface 56 breaks up the generally linear edge of the gap 54 thereby preventing contact lenses from slipping through the gap 54.

FIG. 8 provides a perspective view of the lens retaining appliance 10 of the present invention disposed in a container 11 which is sealed on its open end by the cap 12 attached to the lens retaining means 14.

In use, the cap 12 is unscrewed from the container 11. Once disassembled, the cap 12 and the attached lens retaining means 14 are extracted from the container 11 to permit solution to be disposed therein and for the placement of the contact lenses 52 in the lens retaining means 14.

In order to place contact lenses 52 in the lens retaining means 14 for immersion in the lens cleaning solution in the container 11, the cover means 20 are hingedly opened away from the base portion 18. Once the covers are urged open, the over-center hinge 32 of the hinge means 24 tends to urge or "snap" the cover 20 into the open position and also to retain the cover 20 in the open position. The concave portion of a contact lens 52 is placed against the convex portion of the lens supporting surface 26 whereupon the cover 20 is urged towards the base portion 18 to retain the contact lens 52 therebetween. The over-center hinge 32 retains the cover 20 in a closed position and is stabilized by the stabilizing hinges 34 which prevent the cover from twisting.

Once the contact lenses 52 are retained in the lens retaining means 14, the lens retaining means 14 is inserted into the container 11 to immerse the contact lenses in the lens cleaning solution disposed therein. The cap 12 is threadedly screwed onto the open end of the container 11 to seal the solution within the container 11 during the contact lens 52 cleaning process. During the cleaning process, the contact solution bathes the contact lenses 52 retained in the lens retaining means 14. To enhance the bathing of the contact lenses 52, the cover means 20 has been provided with cover spokes 48 and a cover aperture 50 and the base portion 18 has been provided with base spokes 42 and a base aperture 46 to permit lens cleaning solution to flow therebetween. The abutting surfaces of the covers 20 and the base portion 18 may also be formed with cooperatively mating scalloped surfaces 56 to prevent contact lenses 52 from slipping through any gap between these surfaces while the lenses are immersed in the cleaning solution disposed in the container 11.

Upon sufficient cleaning of the contact lenses 52, the cap means 12 is removed from the container 11 whereupon the appliance 10 is removed. Removal of the appliance 10 from the container 11 produces a suctional adhesion of the contact lenses 52 against the lens supporting surface 26 as the lens cleaning solution is drained from between these two surfaces. To remove the contact lenses from the lens retaining means 14 the cover means 20 are hingedly opened about the hinge axis 22 whereupon they snap into and are held in the open position exposing the convex surface of the contact lens in an easily accessible position. The contact lens 52 is removed by grasping the convex surface of the contact lens and removing it from the lens supporting surface 26.

While particular embodiments of the present invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent after study. As such, the scope of the invention should not be limited by the particular embodiment and specific construction described herein, but should be defined in the depended claims and equivalents thereof. Accordingly, the aim of the appended claims is to cover all such changes and modifications as fall within the true spirit and scope of the invention.

The invention is claimed as follows:

1. A lens storing/cleaning appliance for contact lenses or the like, wherein said lenses may be disposed within a storage/cleaning solution, said appliance comprising: a container having a body with an open end; a removable cap means for closing said container open end; lens retaining means associated with said cap means for captively retaining at least one of a pair of contact lenses for disposition within said container body and a storage/cleaning solution contained therein; said lens retaining means comprising a base portion, a cover means and hinge means by which said cover means is hingedly attached to said base portion; a concave lens supporting surface formed in one of said base portion and cover means for receiving the convex surface of a contact lens placed thereagainst; a convex lens supporting surface formed on the other of said base portion and said cover means for receiving the concave surface of a contact lens placed thereagainst; said cover means being hingedly closable about said hinge means for securely holding said contact lens between said convex surface and said concave surface; said hinge means comprising an over center hinge which is operatively coupled to both said base portion and said cover means, upon hingedly moving said cover means about said hinge means towards said base portion to retain a contact lens therebetween or away from said base portion to remove a lens therefrom, said over-center hinge providing a snap action for retaining said cover means in a closed position when said cover means is hingedly moved towards said base portion and in an open position when said cover means is hingedly moved away from said base portion.

2. An appliance according to claim 1 wherein said lens retaining means retains a pair of contact lenses, said base portion being formed with at least two concave lens supporting surfaces, and said cover means having a convex lens supporting surface formed thereon cooperatively associated with each concave lens receiving portion for retaining said pair of contact lenses within said lens retaining means.

3. An appliance according to claim 2 further including lens indicia integrally formed on said appliance for identifying which lens of a pair of lenses is retained within each section of said lens retaining means.

4. An appliance according to claim 1 wherein said hinge means further comprises stabilizing hinge means defining a common hinge axis with said over-center hinge for stabilizing rotational movement of said cover on said over-center hinge means about said common axis.

5. An appliance according to claim 1 wherein said cover means is formed with spoke structures radiating outwardly from said lens supporting surface forming open areas therebetween, and wherein said lens supporting surface is formed with a cover aperture therethrough to permit lens cleaning solution disposed within said container to pass through said openings and cover aperture for thoroughly bathing said contact lenses retained in said lens retaining means.

6. An appliance according to claim 1 wherein said base portion is formed with spoke structures radiating outwardly from said lens supporting surface forming open areas therebetween and with a central aperture therethrough, said central aperture and said open areas between said outwardly radiating spokes permitting lens cleaning solution disposed within said container to pass through said open areas and central aperture for thoroughly bathing said contact lenses retained in said lens retaining means.

7. An appliance according to claim 1 wherein coperatively formed scalloped shape surfaces are formed on each of abutting peripheral surfaces of said cover means and said base portion such that, when said cover means are closed, said cooperatively formed scalloped shaped surfaces assure the retention of contact lenses therebetween.

8. An appliance according to claim 1 wherein a stem portion attaches said lens retaining means to said cap means; and said cap means, stem portion and lens retaining means are integrally formed of plastic.

9. A lens storage/cleaning appliance for contact lenses or the like wherein said lenses may be disposed within a storage/cleaning solution, said appliance comprising: a container having a body with an open end; removable cap means for closing said container open end; lens retaining means associated with said cap means for captively retaining a pair of lenses for disposition within said container body; said lens retaining means further comprising a base portion with a concave lens receiving portion formed therein for cooperatively receiving the convex surface of a contact lens and cover means hingedly attached to said base portion, said cover means being formed with a convex lens supporting surface for cooperatively receiving the concave portion of a contact lens; said hinge means comprising an over center hinge which is operatively coupled to both said base portion and said cover means, such that upon hingedly moving said cover means about said hinge means towards said base portion for retaining a contact lens therebetween or away from said lens supporting base for removing a contact lens therefrom, said over-center hinge provides a snapping action for retaining said cover means in a closed position when said cover means is hingedly moved towards said base portion and in an open position when said cover means is hingedly moved away from said base portion.

10. An appliance according to claim 9 wherein said lens retaining means retains a pair of contact lenses, said base portion being formed with a pair of concave lens receiving portions, and cover means with a convex lens supporting surface formed thereon being cooperatively associated with each concave lens receiving portion for retaining said pair of contact lenses within said lens retaining means.

11. An appliance according to claim 10 further including lens indicia integrally formed on said appliance for identifying which lens of a pair of lenses is retained within each section of said lens retaining means.

12. An appliance according to claim 11 wherein said hinge means further comprises stabilizing hinge means defining a common hinge axis with said over-center hinge for stabilizing rotational movement of said cover on said over-center hinge means about said common axis.

13. An appliance according to claim 9 wherein said cover means is formed with spoke structures radiating outwardly from said lens supporting surface forming open areas therebetween, and wherein said lens supporting surface is formed with a cover aperture therethrough to permit lens cleaning solution disposed within said container to pass through said openings and cover aperture for thoroughly bathing said contact lenses retained in said lens retaining means.

14. An appliance according to claim 9 wherein said concave lens receiving portion is formed with spoke structures radiating outwardly from a central hub forming open areas therebetween, and with a central aperture formed therethrough, said central aperture and said open areas between said outwardly radiating spokes permitting lens cleaning solution disposed within said container to pass through said open areas and central aperture for thoroughly bathing said contact lenses retained in said lens retaining means.

15. An appliance according to claim 9 wherein said over-center hinge comprises a cover hinge portion, a base hinge portion, and a hinge elbow portion; said cover hinge portion being integrally formed with and connecting said over center hinge to said cover means, said base hinge portion being a living hinge connecting said over-center hinge to said base portion, said hinge elbow portion formed between said cover hinge portion and said base hinge portion permitting articulation of said over-center hinge when opening or closing said cover means relative to said base portion, said over-center hinge being placed in tension at a predetermined point in said opening or closing action when axially elastically deformed by said opening or closing action creating a reaction force in said over-center hinge promoting a snapping action and thereafter retaining said cover means in a desired one of a fully open and fully closed position.

16. An appliance according to claim 9 wherein a stem portion attaches said lens retaining means to said cap means; and said cap means, stem portion and lens retaining means are integrally formed of plastic.

17. An appliance according to claim 9 wherein cooperatively formed scalloped shape surfaces are formed on each of abutting surfaces of said cover means and said base portion such that when said cover means are closed, said cooperatively formed scalloped shaped surfaces assure retention of contact lenses therebetween.

18. A lens retaining appliance for use with a lens cleaning arrangement including a container wherein lenses are disposed within a cleaning solution; said lens retaining appliance comprising: lens retaining means comprising a base portion, a cover means and hinge means by which said cover means is hingedly attached to said base portion; a concave portion formed in one of said base portion and said cover means for receiving the convex surface of a contact lens placed thereagainst; a convex lens supporting surface formed in the other of said base portion and said cover means for receiving the concave surface of a contact lens placed thereagainst; said cover means being hingedly closable about said hinge means for securely holding said contact lens between said convex surface and said concave portion; said hinge means comprising an over-center hinge which is operatively coupled to both said base portion and said cover means, such that upon hingedly moving said cover means about said hinge means towards said base portion to retain a contact lens therebetween or away from said lens supporting base to remove a lens therefrom, said over-center hinge provides a snap action for retaining said cover means in a closed position when said cover means is hingedly moved towards said base portion or in an open position when said cover means is hingedly moved away from said base portion.

19. An appliance according to claim 18 wherein said hinge means further comprises stabilizing hinge means defining a common hinge axis with said over-center hinge for stabilizing rotational movement of said cover on said over-center hinge means about said common axis.

20. A lens retaining appliance comprising: lens retaining means comprising a base portion, a cover means and hinge means by which said cover means is hingedly attached to said base portion; a concave portion formed in one of said base portion and said cover means for receiving the convex surface of a contact lens placed thereagainst; a convex lens supporting surface formed in the other of said base portion and said cover means for receiving the concave surface of a contact lens placed thereagainst; said cover means being hingedly closable about said hinge means for securely holding said contact lens between said convex surface and said concave portion; said hinge means comprising an over-center hinge operatively coupled to both said base portion and said cover means, such that upon hingedly moving said cover means about said hinge means towards said base portion to retain a contact lens therebetween or away from said base portion to remove a lens therefrom, said over-center hinge provides a snapping action for retaining said cover means in a closed position when said cover means is hingedly moved towards said base portion or in an open position when said cover means is hingedly moved away from said base portion.

21. An appliance according to claim 20 wherein said hinge means further comprises stabilizing hinge means defining a common hinge axis with said over-center hinge for stabilizing rotational movement of said cover on said over-center hinge means about said common axis.

* * * * *